No. 717,106. Patented Dec. 30, 1902.
H. F. MARANVILLE & W. F. WARDEN.
OIL FILTER.
(Application filed Apr. 24, 1902.)
(No Model.)
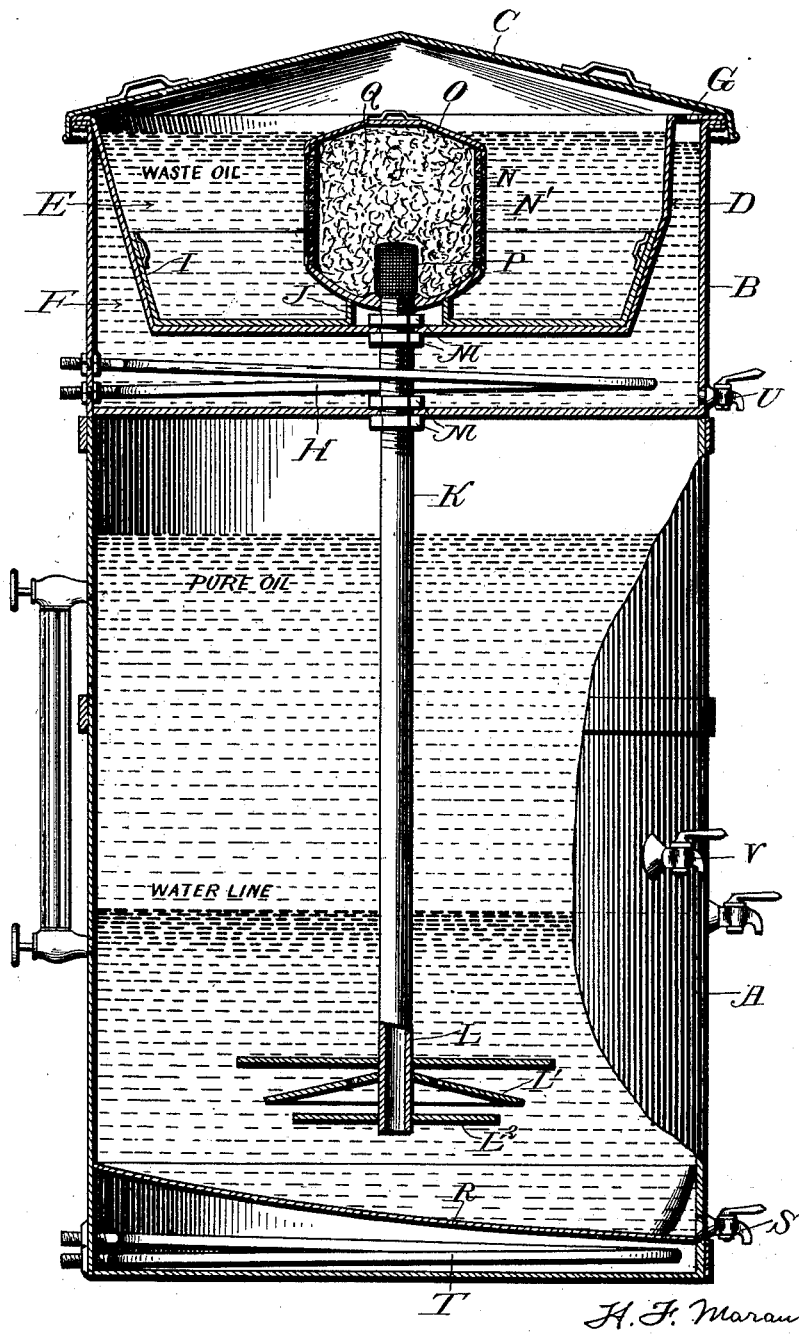
Witnesses
C. H. Walker
J. T. Walker
Inventors
H. F. Maranville
W. F. Warden
By James W. Bevans
their Attorneys

UNITED STATES PATENT OFFICE.

HARVEY F. MARANVILLE AND WILLIAM F. WARDEN, OF AKRON, OHIO, ASSIGNORS TO THE BURT MANUFACTURING COMPANY, OF AKRON, OHIO, A CORPORATION OF DELAWARE.

OIL-FILTER.

SPECIFICATION forming part of Letters Patent No. 717,106, dated December 30, 1902.

Application filed April 24, 1902. Serial No. 104,557. (No model.)

*To all whom it may concern:*

Be it known that we, HARVEY F. MARANVILLE and WILLIAM F. WARDEN, citizens of the United States, residing at Akron, in the county of Summit and State of Ohio, have invented a new and useful Oil-Filter; and we do hereby declare the following to be a full, clear, and exact description of the invention, such as will enable others skilled in the art to which it appertains to make and use the same.

This invention relates to improvements in filters for lubricating-oils; and the object is to provide an improved construction of filter by means of which the foreign substances may be removed from the oil and the latter washed and delivered in a cleansed and purified condition, the work being performed quickly and thoroughly.

With the above object in view the invention consists in the novel features of construction hereinafter fully described, particularly pointed out in the claims, and clearly illustrated by the accompanying drawing, which is a longitudinal sectional view of a filter embodying our invention.

Referring now more particularly to said drawing, A designates a cylindrical tank or vessel closed at its lower end and open at its upper end. Positioned upon the upper end of this tank is a second tank or vessel B, having a closed bottom and a removable cover C at its upper end. The upper tank is separated by a vessel D into two compartments or chambers, a chamber E for the waste oil and a chamber F adapted to contain water and disposed at the sides and bottom of the oil-chamber. The vessel D is so arranged as to close access to the water-chamber, excepting through a filling or inlet opening G, provided in the former, while the oil-chamber is closed by the removable cover C. The water in chamber F is heated by a suitable steam-coil H, positioned therein, and by surrounding the oil-chamber with hot water the oil contained therein is rendered extremely fluid, and at the same time a continuous motion or current is set up therein, greatly facilitating the filtering process.

Positioned in the oil-chamber is a removable sediment-pan I, having a central opening, about which an upwardly-extending flange J is formed for the purpose hereinafter set forth.

Disposed centrally in the tank A is a vertically-extending tube or pipe K, screw-threaded exteriorly at its upper end and carrying at its lower end three plates L, L', and L², disposed one above the other, the central plate L' being inclined and perforated, as illustrated, the function of these plates being to spread the oil and subject it to the cleaning action of the water contained in the tank A. The screw-threaded end of the tube extends through the bottom walls of tank B and vessel D, to which it is secured by nuts M, and projects at its upper end above the flange J of the sediment-pan. Adapted to be secured upon the upper end of the tube is a cylindrical filtering-chamber N, provided with a removable cover O and having its body perforated to permit the entrance of oil to the interior thereof. Placed about the body of the chamber upon the exterior thereof is a band of suitable cloth or other material N', through which the oil may pass, but which will cause a partial separation of the foreign substances from the oil as it passes therethrough. The chamber carries upon its interior a centrally-disposed strainer P, which is secured to the bottom thereof and forms a cap for the upper end of the tube K when the chamber is in position and which assists in the filtration of the oil and also prevents any of the filtering material Q which the chamber may contain from passing into said tube with the oil. In the present instance a filtering material, such as waste, is shown in the chamber; but this may be dispensed with and does not constitute an essential part of our invention. The bottom wall of the filtering-chamber and the flange J of the sediment-pan with which it contacts are of such form as to coöperate when the chamber is screwed in place to form a tight joint and prevent an escape of oil to the water-chamber beneath.

The tank A is provided with an inclined false bottom R to facilitate the removal of the water through the cock S, and in the space between the true and false bottoms a steam-coil T is placed to heat the water in the tank.

Cock U is provided for removing the water from the water-chamber of tank B and cock V for the removal of the oil after it has been cleansed and purified.

The operation of the filter is as follows: The tank A is filled with water up to the point marked "Water line" and water introduced into the water-chamber of tank B through the inlet G. The waste oil—that is, the oil that has become charged with foreign substances by use upon machinery—is placed in the oil-chamber E. The oil passes through the filtering-band N' and the perforations of the chamber N into the said chamber, through the waste therein and through the strainer P into the tube K, down through this tube into the water of tank A, is spread upon the plates and subjected to the cleaning influence of the water, and, passing up through the water, is separated at the water-line, being delivered at this point in a filtered and purified condition. A part of the sediment in the oil drops to the bottom of the sediment-pan, other sediment is removed as the oil passes through the cloth and perforations of the filtering-chamber and as it passes through the waste in said chamber, and still more is removed by the strainer P.

As before stated, either the waste within the chamber or the filtering-band upon the exterior thereof may be dispensed with without departing from the spirit and scope of our invention.

Having thus fully described our invention, what we claim as new, and desire to secure by Letters Patent of the United States, is—

1. An oil-filter comprising a tank divided into two compartments, the upper compartment being divided into a chamber for the oil to be filtered and a water-chamber surrounding the bottom and sides of the oil-chamber, a heating-coil arranged in the water-chamber, a filtering-chamber arranged in the oil-chamber, and a conducting-tube communicating with the filtering-chamber and extending downwardly through the water-chamber into the lower compartment of the tank and terminating adjacent to the lower end of the latter, substantially as described.

2. An oil-filter comprising a tank divided into two compartments, a lower compartment adapted to contain water and an upper compartment divided into a chamber for the oil to be filtered and a water-chamber surrounding the bottom and sides of the oil-chamber, a heating-coil arranged in the water-chamber, a filtering-chamber arranged in the oil-chamber, a conducting-tube communicating with the filtering-chamber and extending downwardly through the water-chamber into the lower compartment and terminating adjacent to the lower end of the latter, and a heating-coil arranged to heat the water in the lower compartment, substantially as described.

3. In an oil-filter, a tank divided into two compartments, a lower compartment adapted to contain water, and an upper compartment divided into an oil-chamber and a water-chamber surrounding the bottom and sides of the oil-chamber, a removable drip-pan in said oil-chamber, a filtering-chamber arranged in said oil-chamber, a heating-coil in said water-chamber, a conducting-tube communicating at its upper end with the filtering-chamber and extending downwardly through the water-chamber into the lower compartment and terminating adjacent to the lower end of the latter, and a heating-coil for said lower compartment, substantially as described.

4. An oil-filter comprising a tank divided into an upper and a lower compartment, said upper compartment being divided into an oil-chamber and a water-chamber surrounding the bottom and sides of the oil-chamber, a heating-coil arranged in said water-chamber, a conducting-tube leading from said lower compartment to the oil-chamber and having its upper end projecting into said oil-chamber and screw-threaded, a drip-pan removably secured in said oil-chamber having a central flange surrounding said projecting end of the tube, a filtering-chamber threaded upon said projecting end of the tube and bearing against the upper edge of said flange of the drip-pan, and a strainer-cap threaded upon the end of the tube within the filtering-chamber, substantially as described.

In testimony whereof we affix our signatures in the presence of two witnesses.

HARVEY F. MARANVILLE.
WILLIAM F. WARDEN.

Witnesses:
LOUISE M. BREWSTER,
JESSIE GREENLESE.